May 9, 1950 H. E. BALSIGER 2,507,330
HEADSTOCK DRIVE
Filed Feb. 21, 1946 4 Sheets-Sheet 1

Inventor
HAROLD E. BALSIGER
By
Hugh D. Roche
Attorney

May 9, 1950 — H. E. BALSIGER — 2,507,330
HEADSTOCK DRIVE
Filed Feb. 21, 1946 — 4 Sheets-Sheet 2

Inventor
HAROLD E. BALSIGER
By Hugh N. Rocker
Attorney

May 9, 1950 H. E. BALSIGER 2,507,330
HEADSTOCK DRIVE
Filed Feb. 21, 1946 4 Sheets-Sheet 3

Inventor
HAROLD E. BALSIGER
By Hugh M Rocke
Attorney

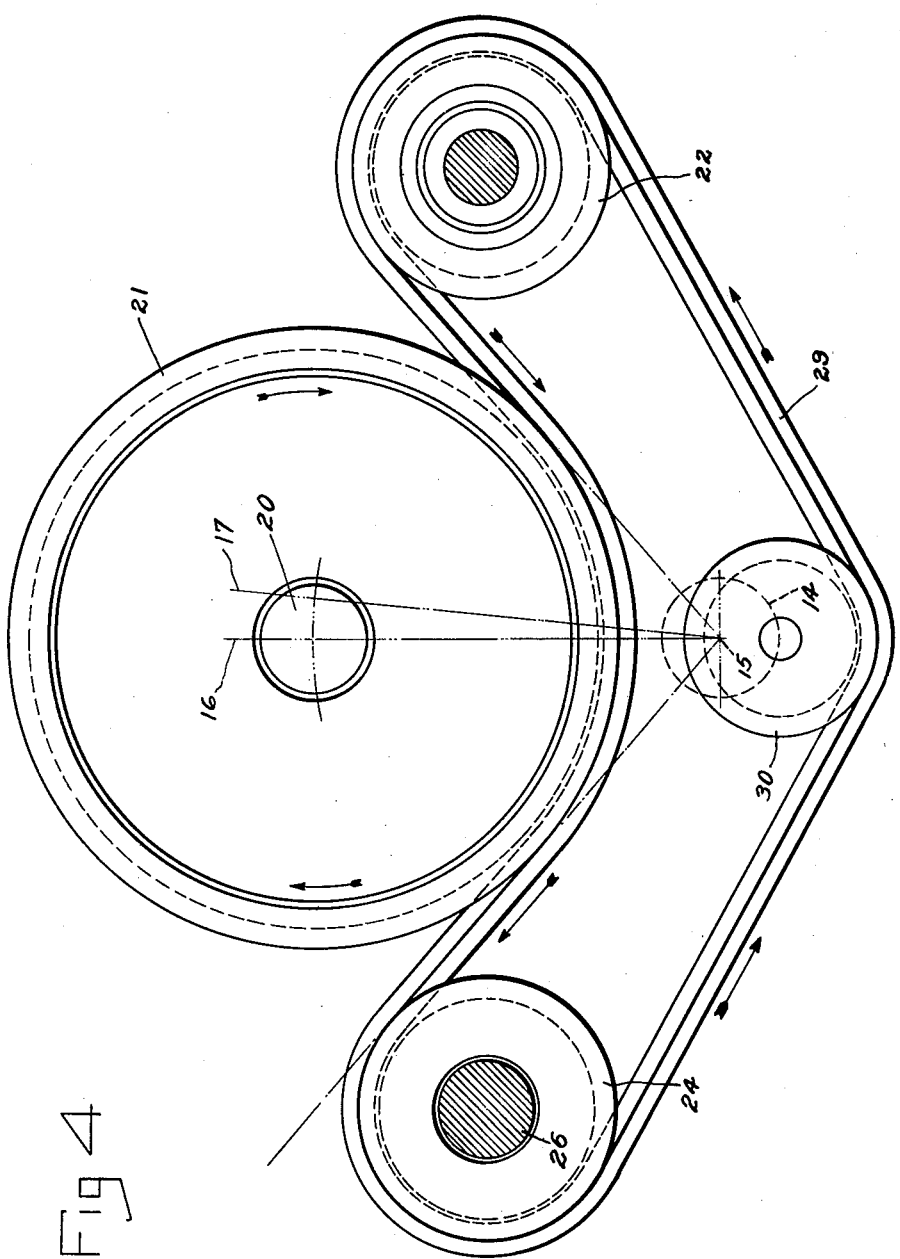

Patented May 9, 1950

2,507,330

UNITED STATES PATENT OFFICE 2,507,330

HEADSTOCK DRIVE

Harold E. Balsiger, Waynesboro, Pa., assignor to Landis Tool Company, Waynesboro, Pa.

Application February 21, 1946, Serial No. 649,261

6 Claims. (Cl. 74—216.5)

This invention relates to headstock drive mechanisms where the headstock spindle is subject to an oscillating movement and a rotary movement at the same time.

The best known application of this type of headstock drive is on a cam grinding machine. Such a drive is shown in Patent No. 2,243,410, granted May 27, 1941, and 2,323,189, granted June 29, 1943, and may consist of a motor and speed reducer driving thru a single reduction belt. The driven pulley is connected to the headstock thru a universal joint or a flexible coupling to permit the rocking movement of the work piece. Instead of using a flexible connection, the pulley may be mounted to oscillate with the head. In this case a belt tightener would be necessary in order to take up the slack in the belt due to change in the center distance between the driving and driven pulleys as the driven pulley rocked with the work support. If the driving pulley rotates about the center of oscillation, there would be no change in belt tension.

In any belt drive there is a tendency for the driven pulley particularly where it is pivotally mounted to move about the pivot in the direction of the tight side of the belt. In cam grinding, this tendency acts to deflect the work cradle in such a way as to urge the master cam out of contact with the follower and thus to interfere in the forming of the proper contour on the cam being ground. In order to resist this tendency, the cradle or oscillating work supporting member is made as rigid as possible. This in turn requires a rather expensive design.

It has been found that the deflection of the cradle caused by the work driving force can be eliminated entirely if the driving force is so controlled that its line of application passes thru the center of oscillation. If this is not practical, the deflection could at least be reduced in proportion to the distance between its line of application and the center of oscillation.

It has been mentioned above that if the driving pulley is mounted to rotate about the center of oscillation of the work cradle there would be no change in belt tension during the rocking movement of the cradle because the center to center distance would remain fixed. However, even this drive has disadvantages which make it impractical. In the first place, even though the belt tension remains constant during the rocking of the cradle the fact that the driving pulley rotates about the same center as the cradle makes it impossible to avoid deflection in the cradle since the driving force is applied along a line which coincides with the belt and such a line could never pass through the center of oscillation. In fact it could never approach the center of oscillation closer than the radius of the driving pulley and the minimum radius of said pulleys permits a considerable lever arm for effecting deflection of the cradle. Furthermore, the distance between the center of oscillation and the center of work rotation is too short for a satisfactory belt drive. This distance can not be changed conveniently because it would involve many other changes in cam grinding equipment.

It is therefore an object of this invention to provide a belt drive for an oscillating member in which the belt tension remains substantially constant during said oscillating movement.

A further object is to provide a belt drive in which the driving load on the work cradle is maintained substantially constant in both magnitude and direction.

A further object is to provide a drive of the type described wherein the force exerted in driving the work does not act to deflect the work support but acts along a line passing thru the center of oscillation of the work cradle.

In the drawings:

Figure 4 is a diagrammatic view of the principal elements of the drive.

Figure 1:
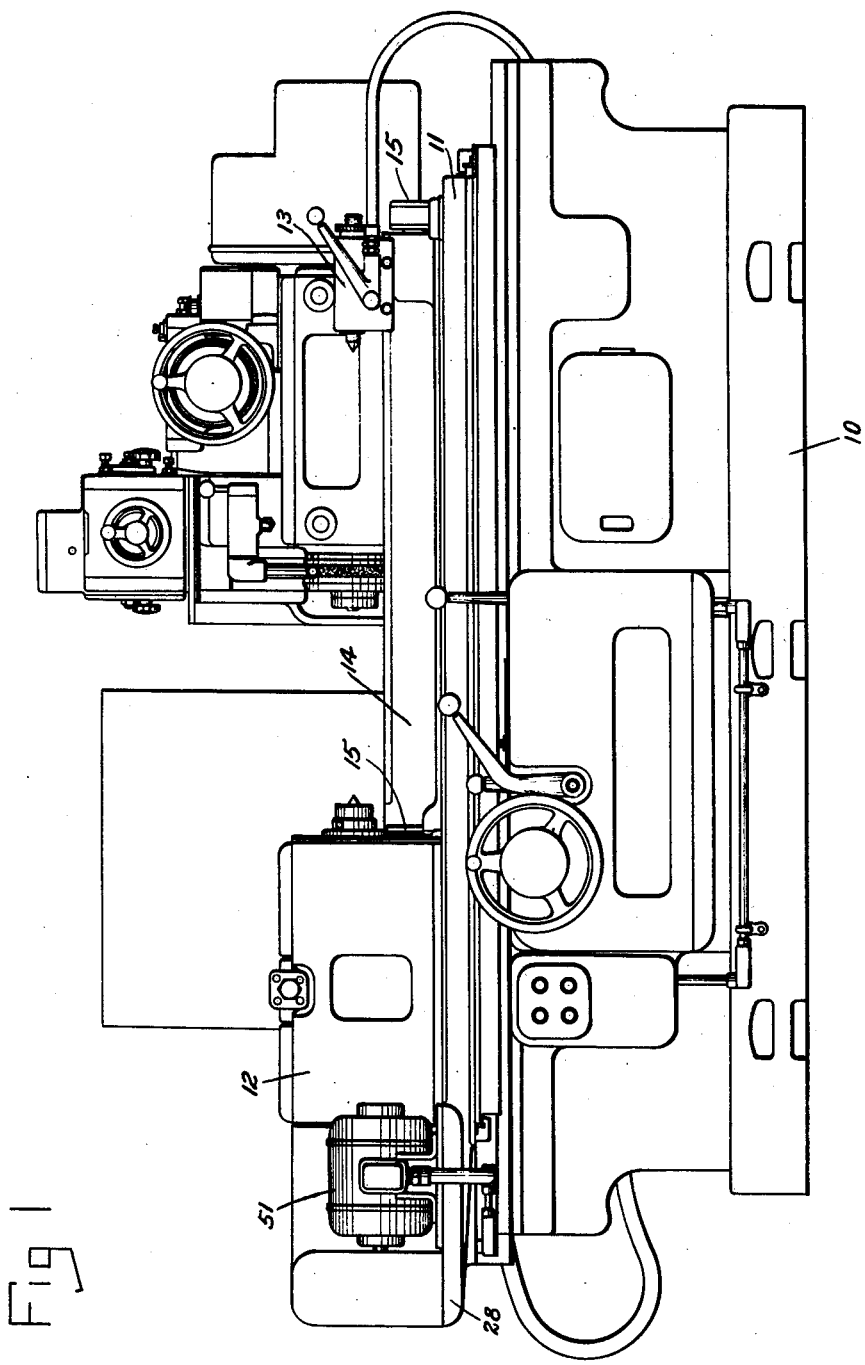
Figure 1 is a front elevation of a cam grinding machine.

The bed of the cam grinder is indicated by numeral 10, the work carriage slidably mounted thereon by numeral 11. A headstock 12 and a footstock 13 are mounted on a cradle 14 pivoted at 15 on said work carriage.

A spindle 20 is mounted in suitable bearings in headstock 12. A large pulley 21 is secured by suitable means to the end of spindle 20. Said spindle and pulley are oscillated during rotation by any one of a series of master cams 31 on said spindle in contact with a roller follower 32. This structure is shown more in detail in the patents mentioned above. A smaller pulley 22 is mounted for free rotation and in alignment with the large pulley 21. The relative positions of pulley 21 and pulleys 22 and 24 is such that the driving force acts along a line passing thru the center of oscillation 21. A pulley member 23 having two portions, one the same diameter as pulley 22 and indicated by numeral 24 and the other of a larger diameter and indicated by numeral 25 is mounted in alignment with pulley 21 but at the opposite side thereof from pulley 22. Pulley member 23 is mounted on a shaft 26 which in turn is supported in a bracket 27 on drive base 28. A series of V belts 29 connect pulleys 22 and 24. The relative positions of pulleys 21, 22 and 24 is such that the backs of said belts are in operative engagement with pulley 21. A guide pulley 30 maintains a suitable spacing between the tight and loose sides of the belts 29.

The large pulley portion 25 is connected by belts 36 to the small pulley 37 of a two part pulley 38. Pulley 38 is rotatably supported on a shaft 39 which in turn is mounted in a bracket 40 on said base 28.

The large pulley portion 45 of pulley member 38 is connected by belts to a pulley 50 on motor 51.

*Operation*

In general, the operation of this invention is apparent from the above description. However a more detailed discussion of the final drive portion of the mechanism is believed desirable.

Figure 2:
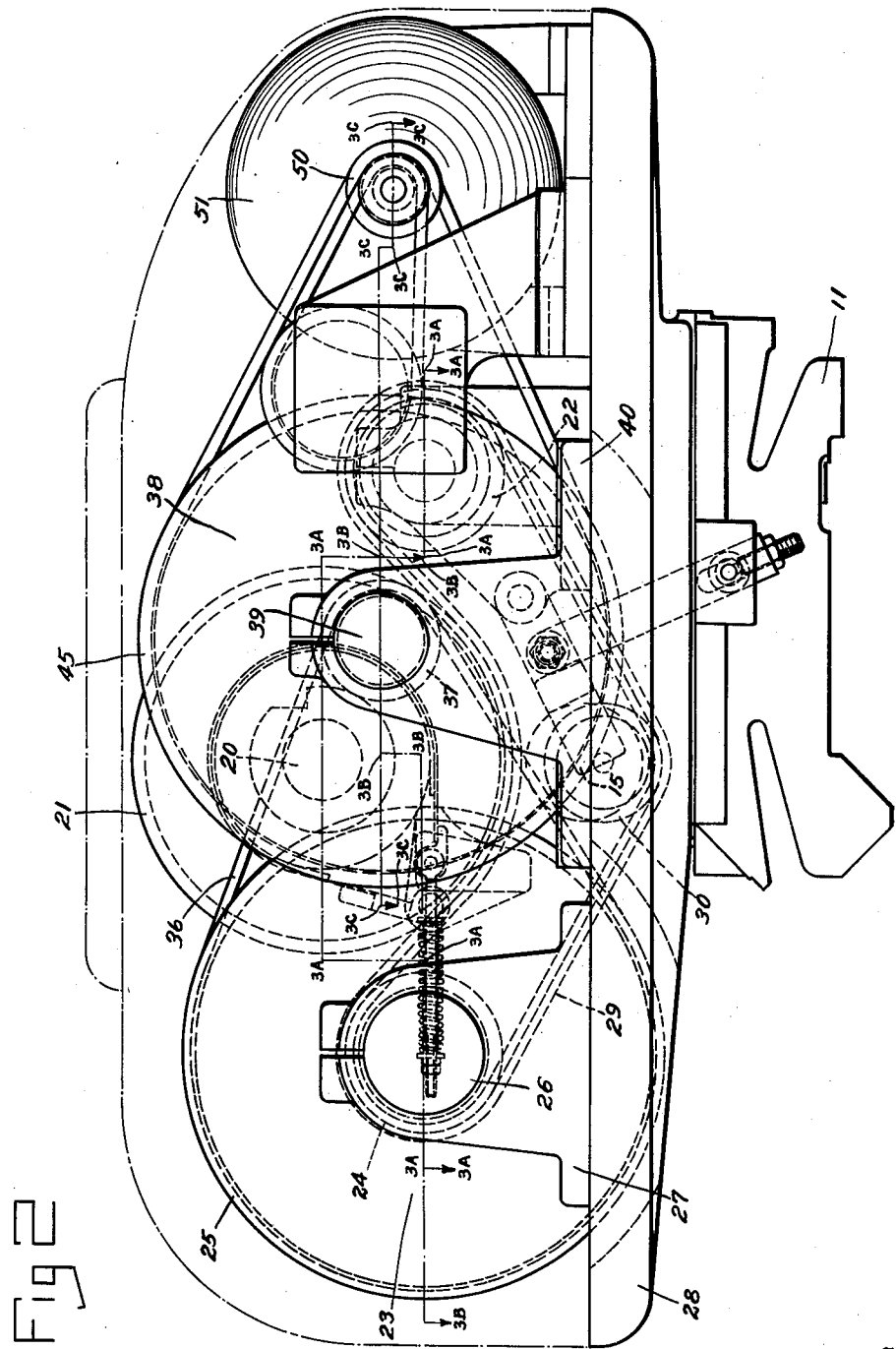
Figure 2 is a left end elevation of the headstock drive mechanism.

As the work cradle 14 rocks about pivot 15 in response to the rotation of the master cam 31, the pulley 21 moves in an arc between the pulleys 22 and 24. Pulley 21 is driven in a clock wise direction, therefore, belts 29 while in contact with said pulley 21 move to the left in Figure 2. The driving force which tends to deflect cradle 14 acts in the same direction. The relative positions of the pulleys 22 and 24, the pulley 21 and the center of oscillation 15 is such that the driving force acts along a line passing thru said center 15 at least while the cam is moving from the heel to the nose which is the interval of maximum driving load. With this arrangement, none of the driving force is transmitted to interfere with contact between master cam 31 and roller 32.

Figure 3:
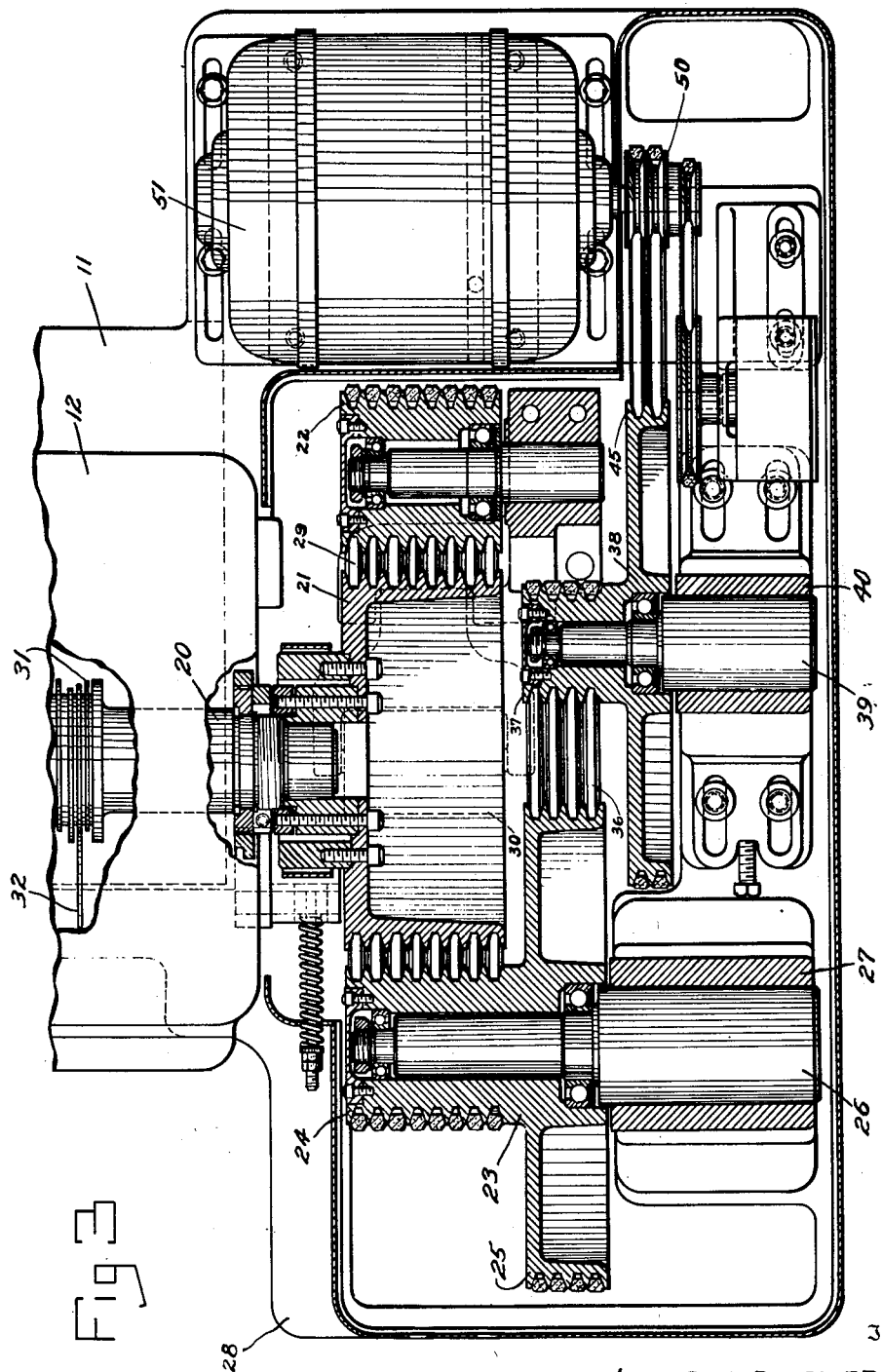
Figure 3 is a partial section on the lines 3a, 3b and 3c of Figure 2.

The extent of oscillation of pulley 21 is indicated by the center lines 16 and 17 joining the center of oscillation and the center of rotation of pulley 21 in its extreme positions. The tension on belts 29 is determined by the center to center distance of pulleys 21 and 30. However this distance as shown in Figure 3 is substantially constant. Thus it may be seen that the tension on the belt remains substantially constant in all positions of pulley 21.

I claim:

1. In a metal working machine an oscillating work support, means for rotatably supporting a work piece thereon, means for rotating said work piece including a pulley oscillatable therewith, a fixed pulley at each side of said oscillating pulley, a belt passing over said fixed pulleys and under said oscillating pulley, one or more additional fixed pulleys positioned to hold the other side of said belt in spaced relation with said oscillating pulley, power means for driving one of said fixed pulleys, the radius of said oscillating pulley approximating the radius of oscillation thereof.

2. In a metal working machine an oscillating work support, means for rotatably supporting a work piece thereon, means for rotating said work piece including a pulley oscillatable therewith, a fixed pulley at each side of said oscillating pulley, a belt passing over said fixed pulleys and under said oscillating pulley, one or more additional fixed pulleys positioned to hold the other side of said belt in spaced relation with said oscillating pulley, power means for driving one of said fixed pulleys, the relative positions of said fixed pulleys and said oscillating pulley being such that the line of force exerted by said belt on said oscillating pulley passes through the center of oscillation of said pulley.

3. In a metal working machine an oscillating work support, a rotatable shaft on said work support in spaced relation to the axis of oscillation, a pulley on said shaft, means for driving said pulley comprising a pair of pulleys mounted in fixed position and spaced in opposite directions from the center of oscillation of said oscillating member, a belt passing over said fixed pulleys and under said oscillating pulley and engaging a substantial portion of said oscillating pulley, and driving means for one of said fixed pulleys.

4. In a metal working machine an oscillating work support, means for rotatably supporting a work piece thereon, means for rotating said work piece including a pulley oscillatable therewith, a fixed pulley at each side of said oscillating pulley, a belt passing over said fixed pulleys and under said oscillating pulley, the relative positions of said fixed pulleys and said oscillating pulley being such that the line of force exerted by said belt on said oscillating pulley passes through the center of oscillation of said pulley.

5. In a metal working machine an oscillating work support, means for rotatably supporting a work piece thereon, means for rotating said work piece including a pulley oscillatable therewith, a fixed pulley at each side of said oscillating pulley, said oscillating movement being toward and from said fixed pulleys, a belt passing over said fixed pulleys and under said oscillating pulley, the distance from the center of oscillation to that part of the pulley contacted by the belt being less than the radius of the pulley.

6. In a metal working machine an oscillating work support, means for rotatably supporting a work piece thereon, means for rotating said work piece including a pulley oscillatable therewith, a fixed pulley at each side of said oscillating pulley, a belt passing over said fixed pulleys and under said oscillating pulley, the portion of the oscillating pulley contacted by the belt being between the center of rotation and the center of oscillation.

HAROLD E. BALSIGER.

REFERENCES CITED

The following references are of record in the file of this patent:

UNITED STATES PATENTS

| Number | Name | Date |
|---|---|---|
| 400,274 | Van Depoele | Mar. 26, 1889 |
| 864,846 | Jenney | Sept. 3, 1907 |
| 1,383,850 | Pitts | July 5, 1921 |